US010462041B2

(12) United States Patent
Surender et al.

(10) Patent No.: US 10,462,041 B2
(45) Date of Patent: Oct. 29, 2019

(54) LINK HEALTH FORECAST—PREDICTIVE ETHERNET LINK MONITORING USING DOM WITH ELOAM

(71) Applicant: Cisco Technology, Inc., San Jose, CA (US)

(72) Inventors: Shrawan Chittoor Surender, Sunnyvale, CA (US); Srinivas Pitta, Cupertino, CA (US); Siddartha Gundeti, San Ramon, CA (US); Arkadiy Shapiro, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 15/010,872

(22) Filed: Jan. 29, 2016

(65) Prior Publication Data
US 2017/0222916 A1    Aug. 3, 2017

(51) Int. Cl.
| | |
|---|---|
| *H04L 12/703* | (2013.01) |
| *H04L 12/707* | (2013.01) |
| *H04L 29/08* | (2006.01) |
| *G06F 16/23* | (2019.01) |
| *H04L 29/06* | (2006.01) |
| *H04L 29/14* | (2006.01) |
| *H04L 12/26* | (2006.01) |
| *H04L 12/24* | (2006.01) |

(52) U.S. Cl.
CPC .............. *H04L 45/22* (2013.01); *G06F 16/23* (2019.01); *H04L 41/069* (2013.01); *H04L 41/0663* (2013.01); *H04L 41/147* (2013.01); *H04L 43/10* (2013.01); *H04L 67/104* (2013.01); *H04L 69/22* (2013.01); *H04L 69/40* (2013.01); *H04L 43/16* (2013.01)

(58) Field of Classification Search
CPC .. H04L 43/16; H04L 45/22; H04L 2012/5625
See application file for complete search history.

(56) References Cited

U.S. PATENT DOCUMENTS

| | | | | |
|---|---|---|---|---|
| 2006/0285500 | A1* | 12/2006 | Booth, III | H04L 41/5035 370/250 |
| 2008/0101241 | A1* | 5/2008 | Mohan | H04L 12/4641 370/236.2 |
| 2010/0290346 | A1* | 11/2010 | Barford | H04L 41/064 370/242 |
| 2013/0010612 | A1* | 1/2013 | Lee | H04L 45/62 370/248 |

FOREIGN PATENT DOCUMENTS

CN            1897497 A   *   1/2007   ............. H04B 10/08

OTHER PUBLICATIONS

Jiang et al., Machine translation of CN 1897497 A1, Jan. 17, 2007, 7 pages. (Year: 2007).*
Daines, EFM OAM Tutorial, Mar. 2004, World Wide Packets, 34 pages. (Year: 2004).*

* cited by examiner

*Primary Examiner* — Hoon J Chung
(74) *Attorney, Agent, or Firm* — Merchant & Gould P.C.

(57) ABSTRACT

Methods and systems are provided for link health forecasting to determine potential link failures such that remedial action may be taken prior to any data loss or degradation. DDM/DOM information may be used in conjunction with OAM protocols to monitor and predict link health degradation for faster failovers or self healing.

20 Claims, 10 Drawing Sheets

SFP Detail Diagnostic Information (internal calibration)

| | Current Measurement | Alarms | | Warnings | |
|---|---|---|---|---|---|
| | | High | Low | High | Low |
| Temperature | 32.25 C | 75.00 C | -5.00 C | 70.00 C | 0.00 C |
| Voltage | 3.27 V | 3.59 V | 3.00 V | 3.46 V | 3.13 V |
| Current | 0.31 mA | 10.50 mA | 2.50 mA | 10.50 mA | 2.50 mA |
| Tx Power | 17.50 dBm | 21.40 dBm | 8.00 dBm | 18.40 dBm | 12.00 dBm |
| Rx Power | 17.35 dBm | 22.00 dBm | 6.00 dBm | 18.00 dBm | 10.00 dBm |

Transmit Fault Count = 0

FIG. 2

LINK HEALTH FORECAST—PREDICTIVE ETHERNET LINK MONITORING USING DOM WITH ELOAM

TECHNICAL FIELD

The present disclosure relates generally to Ethernet based networks and specifically to link monitoring between customer edge devices and provider edge devices in massively scalable data centers.

BACKGROUND

Ethernet Link Operations, Administration, and Management (ELOAM) such as defined in the IEEE 802.3ah standard may provide for link monitoring. For example, it may be desired to monitor links between customer edge devices and provider edge devices. In the case of massively scalable data centers, the large scale may require links of 40G, 100G, or greater. As such, link monitoring becomes important so that large scale data losses can be avoided. Prior monitoring solutions, such as Unidirectional Link Detection (UDLD) and Bidirectional Forwarding Detection (BFD) do not provide a desired light-weight protocol, cannot be easily offloaded into a Linecard CPU, or are not extensible.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 2 illustrates the DDM/DOM information table 200 at an SFP transceiver, such as transceiver 110.

DETAILED DESCRIPTION OF EXAMPLE EMBODIMENTS

Overview

Figure 1:
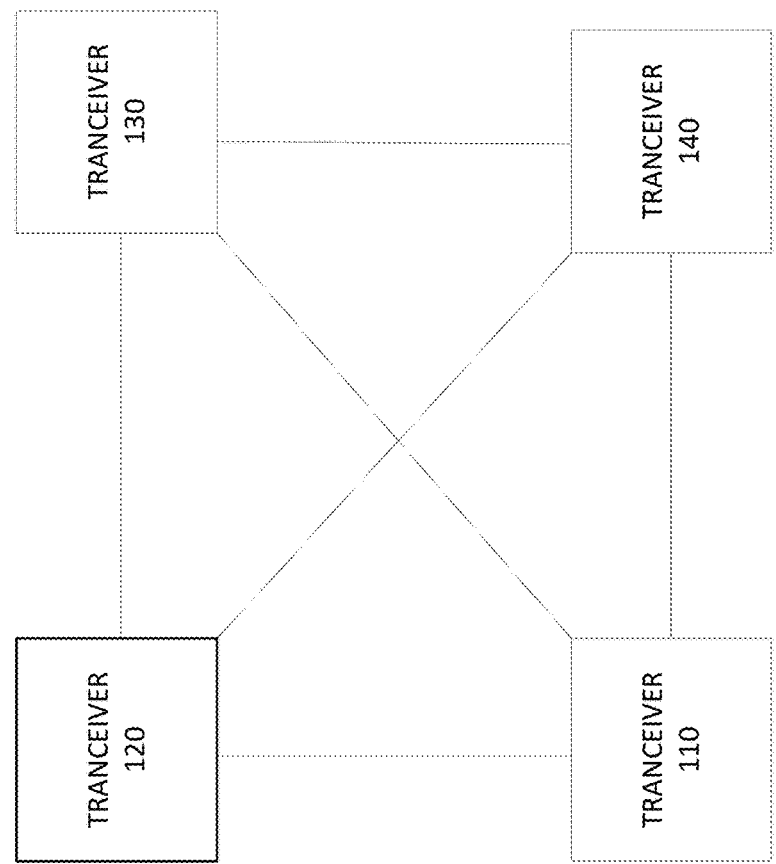
FIG. 1 illustrates an operating environment for embodiments of the present disclosure.

Methods and systems are provided for predicting link health comprising continuously sharing DDM/DOM information between a plurality of peer devices, wherein the DDM/DOM information is shared using an organizational specific TLV transmitted using ELOAM protocol. Furthermore, the shared DDM/DOM information and local DDM/DOM information may be continuously monitored at each of the peer devices to identify potential link failures. A potential link failure may be identified when one or more values in the shared DDM/DOM information and local DDM/DOM information exceeds a respective threshold.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Link monitoring may provide for detecting link faults and informing the OAM peer of the detected faults. Basic link monitoring, as discussed in the IEEE 802.3ah Clause 57 Standard allows for detecting link faults and informing the OAM peer of such faults. Notably, one of the most challenging types of faults to detect on an Ethernet link is when the quality of the link deteriorates gradually over time. With prior link monitoring, it may be possible to configure certain error thresholds on either side of an Ethernet link. Event notifications may then be triggered when these thresholds are exceeded. In other words, the OAM will only be aware of error conditions and act on them after the thresholds are exceeded.

ELOAM is an extensible, light-weight protocol which provides advantages over UDLD and BFD. Particularly, ELOAM may easily be offloaded into a linecard, which may allow for easy implementation. Information OAM Protocol Data Units (PDUs) may be regularly sent, for example, one OAMPDU per second. Notably, ELOAM is a slow protocol, meaning that it uses very modest bandwidth with a maximum of 10 packets per second per interface.

Embodiments of the present disclosure expand upon ELOAM to provide the prediction of a possible degradation of an Ethernet link prior to reaching error thresholds. This allows corrective measures to be employed prior to link breakdown. Avoiding link breakdowns may be especially important in the context of 100G and 400G Ethernet pipes carrying large amounts of data.

FIG. 1 illustrates an operating environment 100 for embodiments of the present disclosure. Operating environment 100 may be a massively scalable data center with a number of peer transceivers in communication with one another, such as transceivers 110, 120, 130, and 140. A transceiver, such as transceiver 110 may be a Small Form-factor Pluggable (SFP) transceiver or a C Form-factor Pluggable (CFP) transceiver. SFP transceivers are typically used for 10G Ethernet implementations, while CFP transceivers may be used for 40G or 100G Ethernet implementations.

Transceivers, such as transceiver 110, support Digital Diagnostic Monitoring/Digital Optical Monitoring (DDM/DOM). FIG. 2 illustrates the DDM/DOM information table 200 at an SFP transceiver, such as transceiver 110. DDM/DOM information table 200 maintains a number of parameters that are continuously monitored on transceiver 110. For example, DDM/DOM information table 210 may monitor temperature, voltage, current, Tx power, Rx power, and transmit fault information.

FIG. 2 illustrates DDM/DOM information table 200 for an SFP transceiver, such as transceiver 110. DDM/DOM information table 200 provides continuously updated current measurement information 205 for a number of variables. For example, current measurement information 205 may be provided for temperature 220, voltage 225, current 230, Tx power 235, and Rx power 240. DDM/DOM information table 200 may further maintain a number of alarm thresholds 210 for each of these variables. In some embodiments, alarm thresholds 210 may be provided for both a high level and a low level for each variable.

DDM/DOM information table 200 may further maintain a number of warning thresholds 215 for each of these variables. In some embodiments, warning thresholds 215 may be provided for both a high level and a low level for each variable. It may be seen that warning thresholds 215 may be set at less extreme values than alarm threshold 210. In other words, warning thresholds 215 may correspond to trigger remedial actions before values reach alarm thresholds 210. DDM/DOM information table 200 may further track a transmit fault counter 245. Transmit fault counter may indicate the number of transmit faults that have occurred involving transceiver 110.

Figure 3:
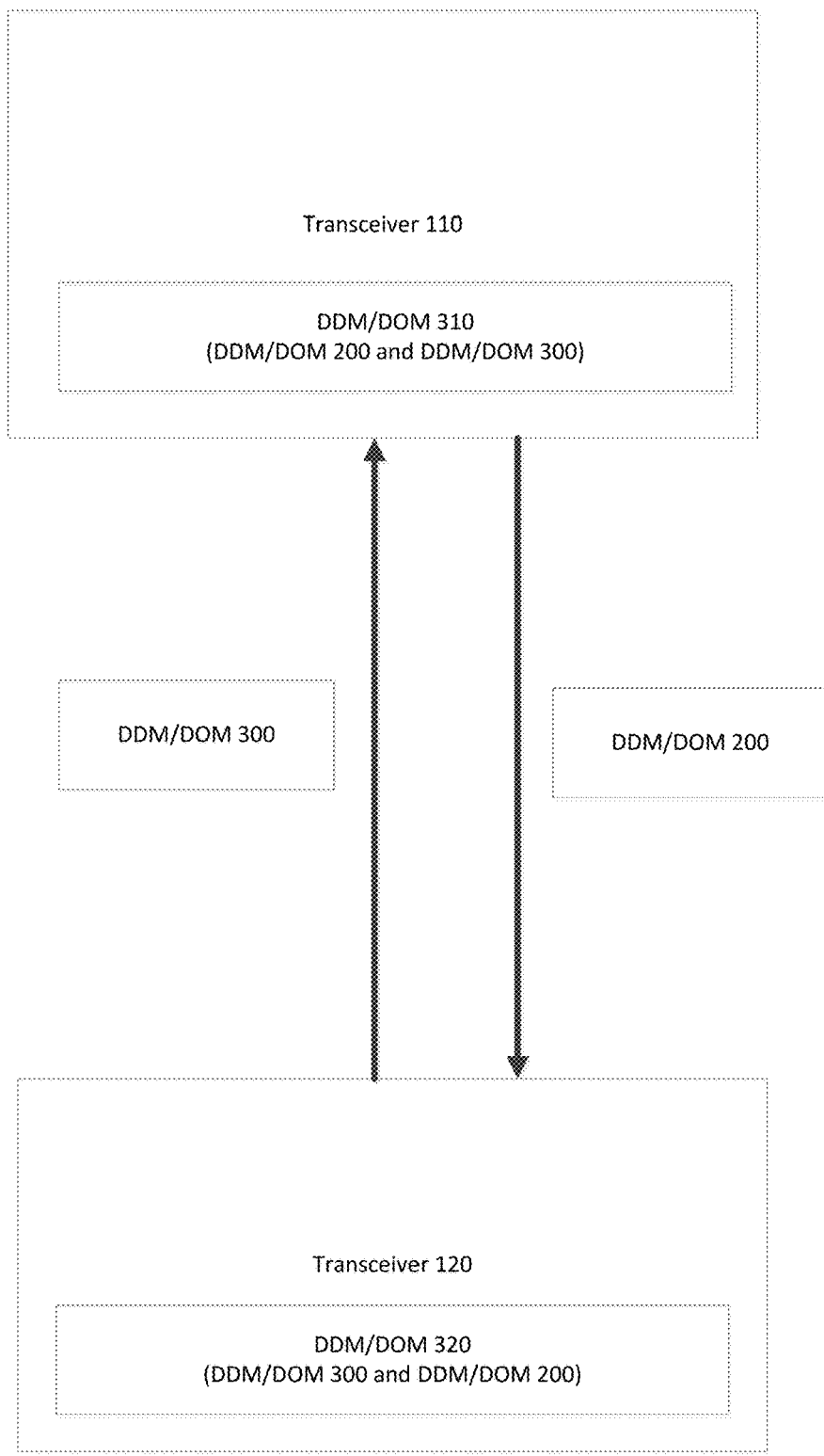
FIG. 3 illustrates embodiments of the present disclosure where DDM/DOM information tables such as DDM/DOM information table 200 may be exchanged between transceiver peers, such as transceiver 110 and transceiver 120.

FIG. 3 illustrates embodiments of the present disclosure where DDM/DOM information tables such as DDM/DOM information table 200 may be exchanged between transceiver peers, such as transceiver 110 and transceiver 120. For example, transceiver 110 may continuously update transceiver 120 with DDM/DOM information table 200 which corresponds to the status of transceiver 110. Similarly, transceiver 120 may continuously update transceiver 110 with a DDM/DOM information table 300 which corresponds to the status of transceiver 120.

Accordingly, both transceiver 110 and 120 may maintain a combined DDM/DOM information table containing both local metrics and remote peer metrics. In this case transceiver 110 may maintain DDM/DOM information table 310. DDM/DOM information table 310 may contain information from local DDM/DOM information table 200 and remote DDM/DOM information table 300. Similarly, transceiver 120 may maintain DDM/DOM information table 320. DDM/DOM information table 320 may contain information from local DDM/DOM information table 300 and remote DDM/DOM information table 200. As such, each transceiver can monitor metric information on both sides of a link between itself and a peer device. In some embodiments of the present disclosure, when a transceiver discovers a metric that has reached a warning threshold, remedial action can be taken prior to link failure to avoid traffic loss or degradation.

Figure 4:
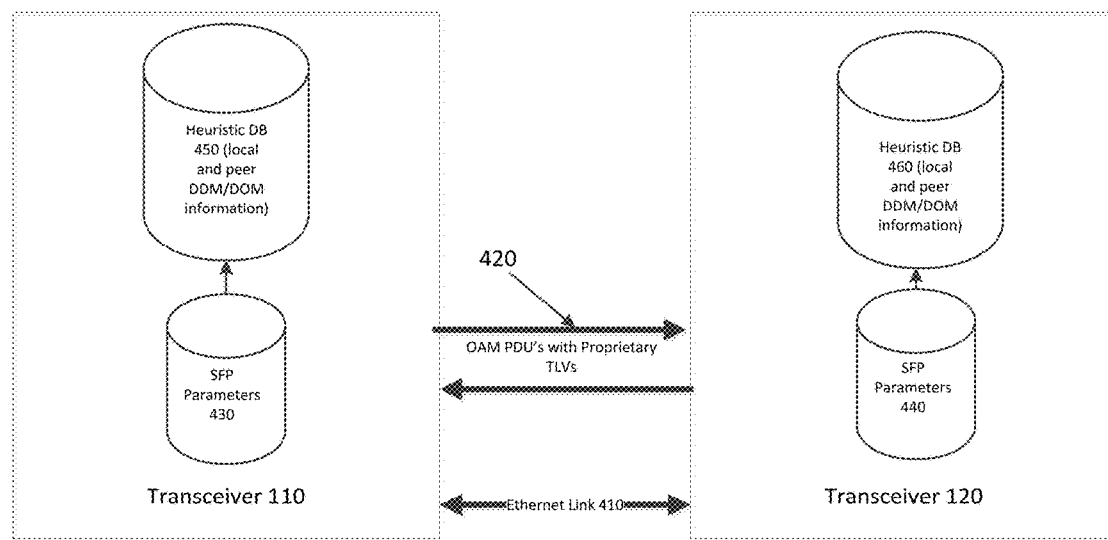
FIG. 4 illustrates the transceiver peer to peer sharing of DDM/DOM information in further detail.

FIG. 4 illustrates the transceiver peer to peer sharing of DDM/DOM information in further detail. Transceiver 110 and transceiver 120 may be peer devices connected to one another via Ethernet link 410. Transceiver 110 may contain an SFP parameter database 430 containing any number of parameters specific to transceiver 110 such as physical parameters. SFP parameter database 430 may be in communication with a heuristic database 450. Heuristic database 450 is also maintained in transceiver 110. Heuristic database may maintain local DDM/DOM information as well as peer DDM/DOM information. Such information may be maintained in tables such as DDM/DOM information table 200.

Similarly, transceiver 120 may contain an SFP parameter database 440 containing any number of parameters specific to transceiver 120 such as physical parameters. SFP parameter database 440 may be in communication with a heuristic database 460. Heuristic database 460 is also maintained in transceiver 120. Heuristic database 460 may maintain local DDM/DOM information as well as peer DDM/DOM information. Again, such information may be maintained in tables such as DDM/DOM information table 200. In some instances, variable sensors may provide false alarm information. The heuristic databases may apply heuristics to remove such false alarm instances.

Each transceiver may provide the peer information for storage by the other transceiver through exchange of OAMPDUs with proprietary type length values (TLVs) according to embodiments of the present disclosure across ELOAM link 420. As such, each transceiver may be able to study and forecast possibility of a link error on Ethernet link 410 by studying both the SFP parameters as well as the DDM/DOM information. It may then be predicted whether Ethernet link 410 will deteriorate within a short or finite time period.

These embodiments serve to increase the speed and usability of OAM link monitoring by triggering event notification prior to errors starting to occur. For example, event notifications may notify system administrators, to allow them to take remedial action before experiencing traffic loss or degradation. In some embodiments of the present disclosure, a link health trigger may only be sent when voltage, temperature and power parameter are all past a warning level threshold. Such values may directly imply that a link is getting ready to degrade.

Figure 5:
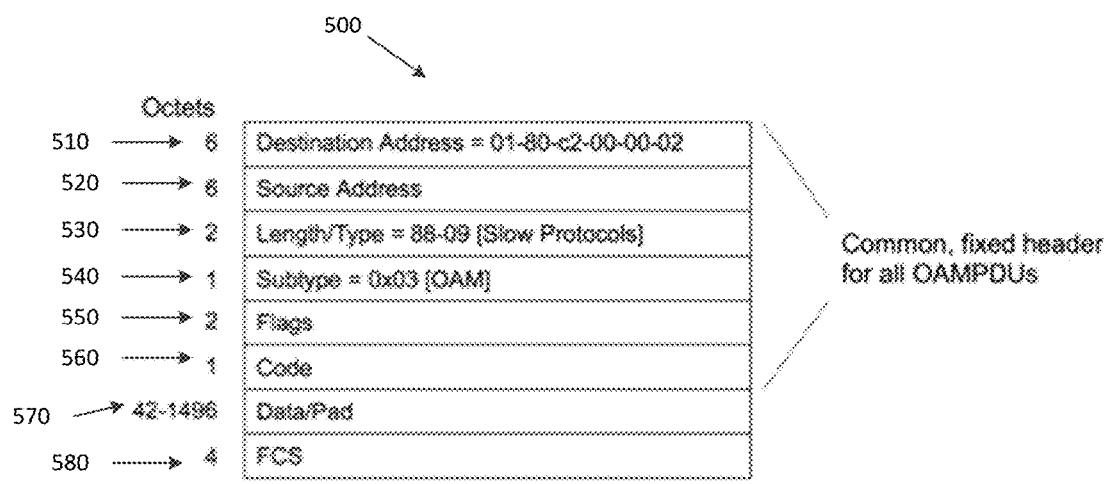
FIG. 5 illustrates the OAMPDU structure according to IEEE 802.3ah Clause 57 Standard.

Embodiments of the present disclosure provide new TLVs for exchanging SFP and DDM/DOM information across ELOAM link 420. This allows for monitoring link health on both ends of a link, such as Ethernet link 410. FIG. 5 illustrates the OAMPDU structure according to IEEE 802.3ah Clause 57 Standard. OAMPDU 500 may contain eight data fields. The first six fields may represent the common, fixed header for all OAMPDUs.

The header of OAMPDU 500 may contain a destination address field 510 indicating a destination address for the OAMPDU. The header of OAMPDU 500 may next contain a source address field 520 indicating a source address for the OAMPDU. The header of OAMPDU 500 may next contain a length/type field 530 indicating an Ethertype value indicating a slow protocol for the OAMPDU. The length/type field 530 may identify the frame as a slow protocol frame. The standard defines several slow protocols; one example is link aggregation control protocol (LACP).

The different slow protocols may be identified through the slow protocol subtype contained in subtype field 540. For example, subtype 3 may be designated for OAM. Utilizing the slow protocol MAC address, OAMPDUs are guaranteed to be intercepted by the MAC sublayer and will not propagate across multiple hops in an Ethernet network, regardless of whether OAM is implemented or enabled.

Next, the header of OAMPDU 500 may contain a flag field 550. Flag field 550 may be used to convey severe error conditions to the peer transceiver. In some embodiments, the severe error conditions may be defined as: 1) Link Fault:

This flag is raised when a station stops receiving a transmit signal from its peer. 2) Dying Gasp: This flag is raised when a station is about to reset, reboot, or otherwise go to an operationally down state. 3) Critical Event: This flag indicates a severe error condition that does not result in a complete re-set or re-boot by the peer transceiver.

Finally, the header of OAMPDU 500 may contain a code field 560. Code field 560 may provide information regarding OAM data carried by TLVs. For example, code field may contain the following values: 0x00: Information (using discovery phase and then during keepalive); 0x01: Event notification (convey Link Event information to inform remote peer of a local link event); 0x02: Variable request for polling; 0x03: Variable response for polling; and 0x04: Loopback control information.

The data (and associated padding) transmitted by OAMPDU 500 may then be provided in data field 570. Data field 570 may be located directly after the OAMPDU header. Finally, the payload of OAMPDU 500 may contain a frame check sequence (FCS) field 580. FCS field 580 may contain a number that is calculated by a source node based on the data in the OAMPDU. When a destination node receives the OAMPDU, the FCS number may be recalculated and compared with the FCS number included in the OAMPDU. If the two numbers are different, an error may be assumed.

Figure 6:
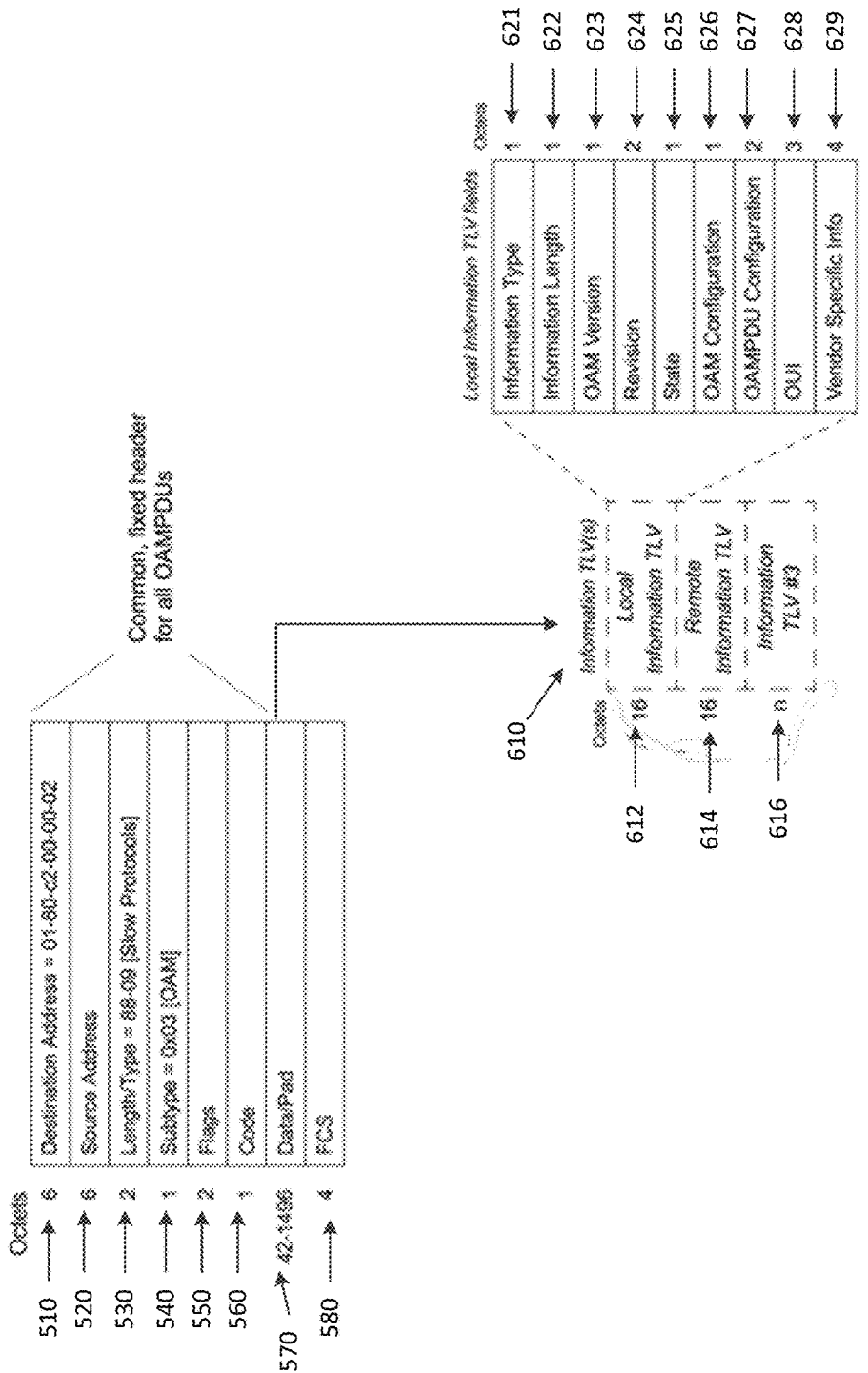
FIG. 6 illustrates embodiments of the present disclosure expanding OAMPDU 500 with an extension TLV for link health monitoring.

Embodiments of the present disclosure expand OAMPDU 500 with an extension TLV for link health monitoring as illustrated in FIG. 6. Specifically, data field 570 of OAMPDU 500 may be altered to contain information TLVs 610. Information TLVs 610 may contain a local information TLV 612, a remote information TLV 614, and additional TLVs, such as information TLV 616.

According to embodiments, local information TLV 612 may be partitioned into a number of information TLV fields. For example, local information TLV 612 may contain an information type field 621. Information type field 621 may contain a value indicative of an organizational specific TLV. For example, a value of 0xFE may indicate a CISCO specific TLV. Next, local information TLV 612 may contain an information length field 622. Information length field 622 may contain a value indicative of the length of the organizational specific TLV.

Local information TLV 612 may then contain an OAM version field 623. OAM version field 623 may contain a value indicative of the OAM version employed by local information TLV 612. Next, a revision field 624 may contain a value indicative of the configuration revision of an OAM peer as reflected in a latest OAMPDU. This attribute may be changed by the OAM peer whenever it has a local configuration change for Ethernet OAM.

Local information TLV 612 may then contain a state field 625. State field 625 may contain a value indicating the state of the sending transceiver. Next, OAM configuration field 626 may contain a value to advertise the capabilities of the local transceiver. With this information, a peer can determine what functions are supported and accessible; for example, loopback capability.

Local information TLV 612 may then contain an OAMPDU configuration field 627. OAMPDU configuration field 627 may contain a value indicating a maximum OAM PDU size for receipt and delivery. This information along with the rate limiting of 10 frames per second can be used to limit the bandwidth allocated to OAM traffic. Next, organization unique identifier (OUI) field 628 may contain a value that uniquely identifies the organization implementing the TLV solution. Finally, local information TLV 612 may contain a vendor specific information field 629. Vendor specific information field 629 may contain information specific to the vendor identified in OUI field 628.

Figure 7:
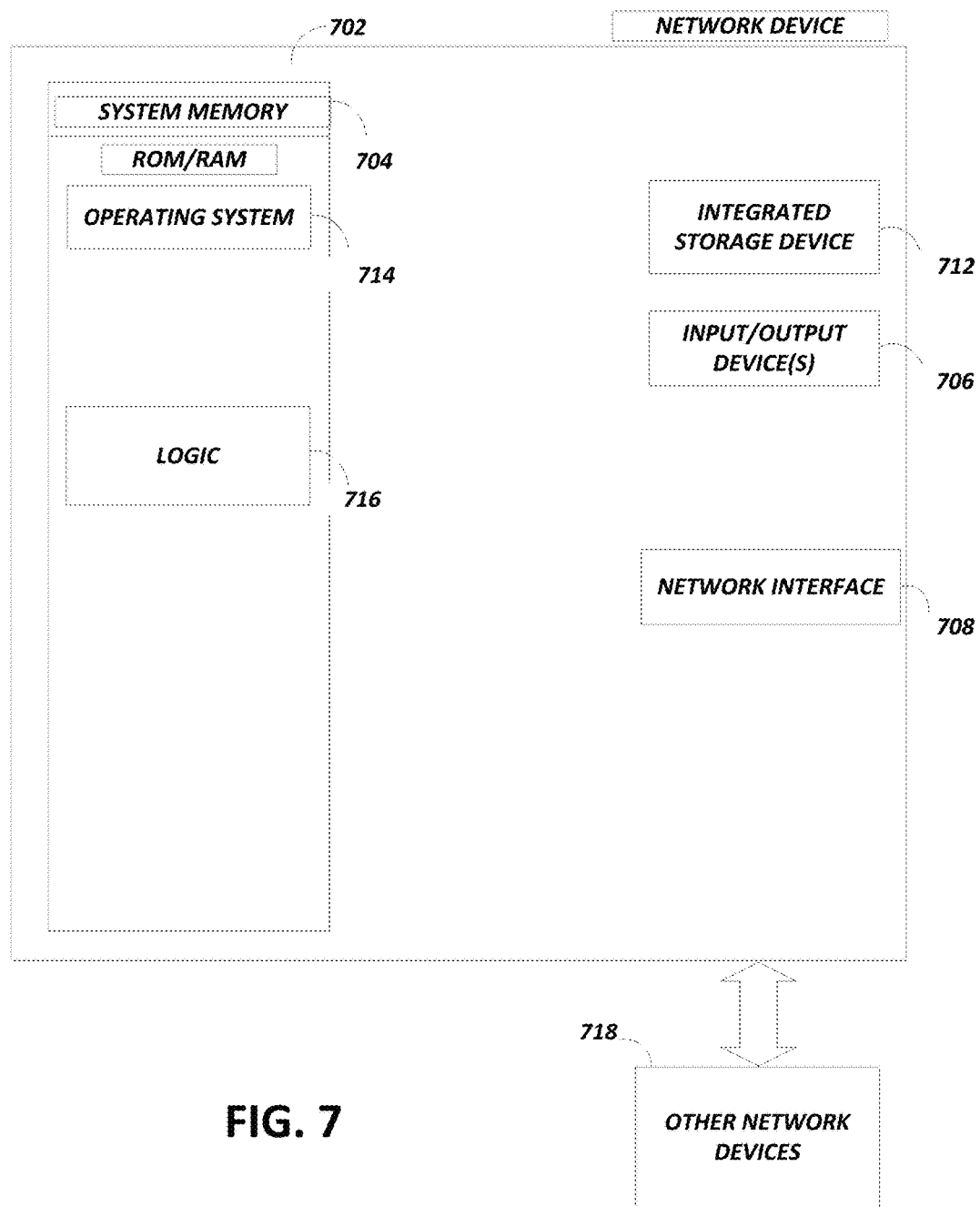
FIG. 7 is a system diagram of a network device operable with embodiments of the present disclosure.

FIG. 7 shows a network device, such as a router, switch, fabric edge device, or any other network device that may employ embodiments of the present disclosure in greater detail. The network device may include at least a processing device 702, a memory 704, input/output (I/O) devices 706, and a network interface 708, each of which is communicatively coupled via a local interface 710. The MAC tables may be located within memory 704. Processing device 702 may be a hardware device for executing software, particularly that which is stored in memory 704. Processing device 702 may be any custom made or commercially available processor, a central processing unit (CPU), an auxiliary processor among several processors associated with a content server, a semiconductor-based microprocessor (in the form of a microchip or chip set), a microprocessor, or generally any device for executing software instructions. The forwarding engine may be implemented by processing device 702.

I/O devices 706 may include input devices, for example but not limited to, a keyboard, mouse, scanner, microphone, etc. Furthermore, the I/O devices 706 may also include output devices, for example but not limited to, a printer, display, etc.

Network interface 708 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

Local interface 710 may be, for example but not limited to, one or more buses or other wired or wireless connections. Local interface 710 may have additional elements, which are omitted for simplicity, such as controllers, buffers (caches), drivers, repeaters, and receivers, to enable communications. Further, local interface 710 may include address, control, and/or data connections to enable appropriate communications among the aforementioned components and provides the interface to communicate with processing device 702.

In some embodiments, the network device may further be configured with an integrated storage device 712 coupled to local interface 710. Storage device 712 may be configured to store a plurality of content chunks. In some embodiments, storage device 712 may be used for storage of one or more MAC tables or mapping tables.

Memory 704 may include a suitable operating system (O/S) 714. Operating system 714 essentially may control the execution of other computer programs, such as scheduling, input-output control, file and data management, memory management, and communication control and related services. Logic 716 may include executable code to send TLVs to other network devices.

Memory 704 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 704 may incorporate electronic, magnetic, optical, semi-conductive, and/or other types of storage media. Note that memory 704 may have a distributed architecture, where various components are situated remotely from one another, which can be accessed by the processing device 702.

The software in memory 704 may include one or more separate programs, each of which comprises an ordered listing of executable instructions for implementing logical functions. In the embodiment shown, the software in memory 704 may include operating system 714 and logic 716, as explained above. Functionality of logic 716 may be implemented using a single module, or distributed among a plurality of modules.

When logic 716 is in operation, processing device 702 may be configured to execute logic 716 stored within memory 704, to communicate data to and from memory 704, and to generally control operations of logic 716. Logic 716 and O/S 714, in whole or in part, but typically the latter, are read by processing device 702, perhaps buffered within processing device 702, and then executed.

The network device may include a communication interface suitable for enabling communication (e.g., TCP/IP) with other network devices, and for receiving and processing forwarding requests to provide overlay communication services to a switch. For instance, communication interface may be of a type suitable for communication over an IP network, a coaxial cable network, an HFC network, and/or wireless network, among others.

A communications port (or ports) may further be included in the network device for receiving information from and transmitting information to other devices. For instance, a communication port may feature USB (Universal Serial Bus), Ethernet, IEEE-1394, serial, and/or parallel ports, etc. In addition, a communications port may be configured for home networks (e.g., HPNA/MoCA, etc.).

Figure 8:
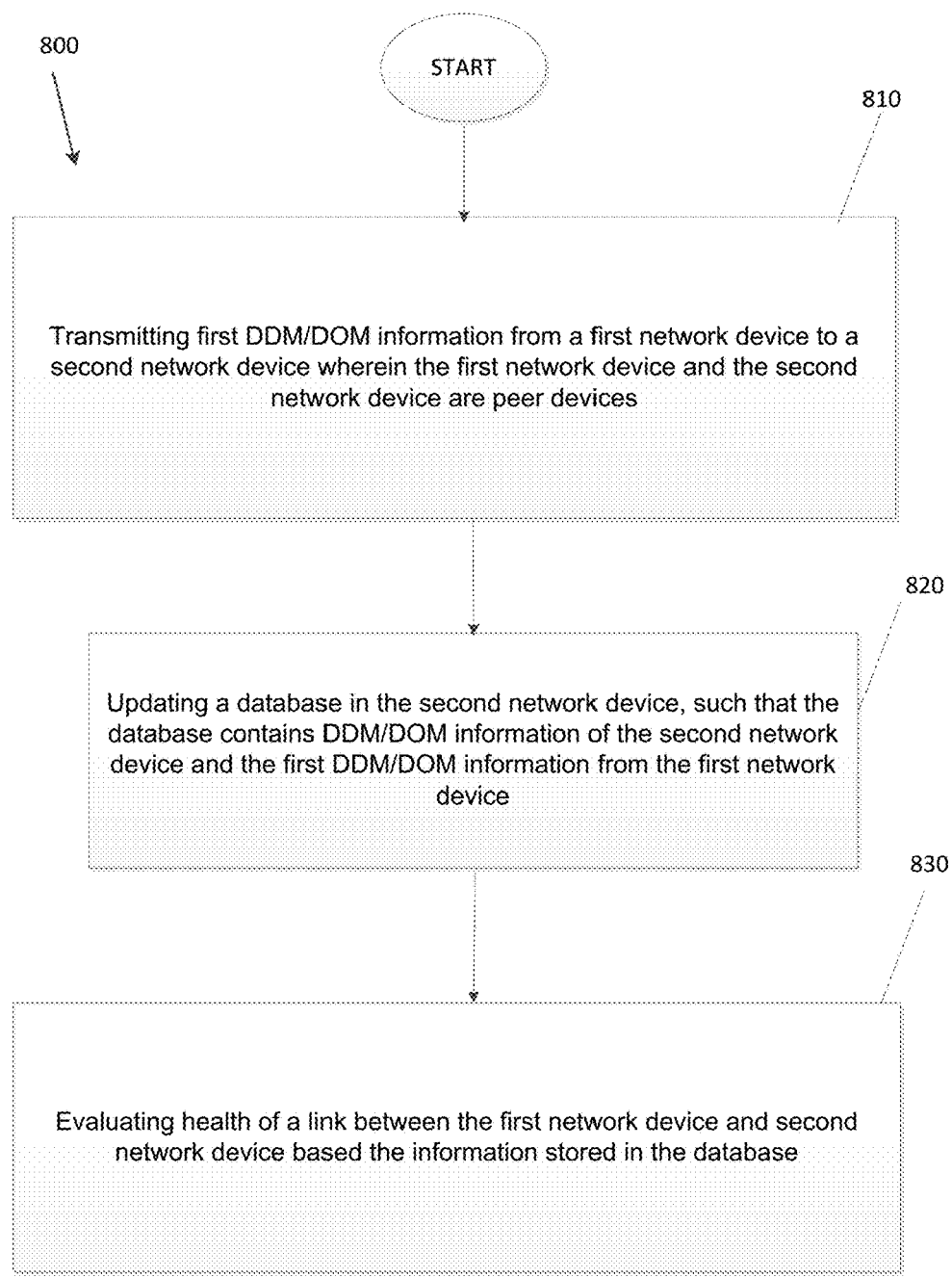
FIG. 8 is a flow chart illustrating embodiments of the present disclosure.

FIG. 8 is a flow chart illustrating certain embodiments of the present disclosure. Method 800 may begin at step 810 where first DDM/DOM information may be transmitted from a first network device to a second network device wherein the first network device and the second network device are peer devices. For example, the first network device may contain a DDM/DOM information table such as DDM/DOM information table 200. The information from the DDM/DOM information table may be transmitted to the second network device and any other peer devices to the first network device. In some embodiments of the present disclosure, the first network device and the second network device comprise transceivers in a massively scalable data center.

Method 800 may then proceed to step 820. At step 820, a database in the second network device may be updated, such that the database contains DDM/DOM information of the second network device and the first DDM/DOM information from the first network device. In some embodiments of the present disclosure, the first DDM/DOM information is transmitted to the second network device through a TLV extension to an OAMPDU. In some embodiments, the first DDM/DOM information is transmitted to the second network device a TLV extension to an ELOAM OAMPDU. In embodiments of the present disclosure, the TLV extension may comprise at least information identifying the TLV extension as an organization specific TLV.

Next, method 800 may proceed to step 830. At step 830, the health of a link between the first network device and second network device may be evaluated based the information stored in the database. For example, evaluating health may comprise comparing values in the DDM/DOM information with predetermined warning thresholds. Remedial action may be taken for the link if a voltage value, a temperature value, and one or more power values in the DDM/DOM information each exceed respective predetermined warning thresholds. In some embodiments, any single value or combination of values in the DDM/DOM information may be used to evaluate the health of the link.

Figure 9:
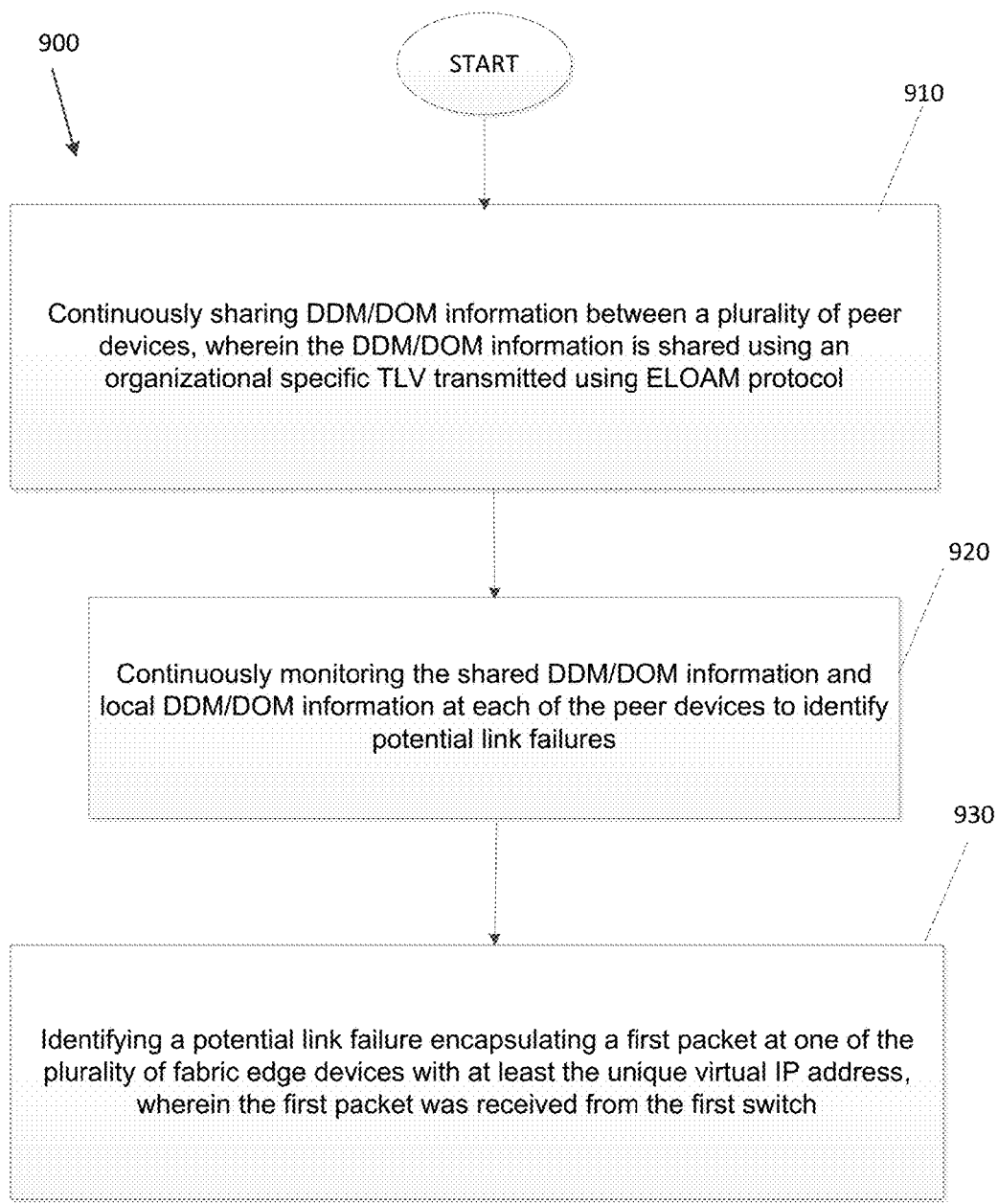
FIG. 9 is a flow chart illustrating embodiments of the present disclosure.

FIG. 9 is a flow chart illustrating certain embodiments of the present disclosure. Method 900 may start at step 910 where DDM/DOM information may be continuously shared between a plurality of peer devices, wherein the DDM/DOM information is shared using an organizational specific TLV transmitted using ELOAM protocol. In some embodiments of the present disclosure, the organizational specific TLV may be inserted into an ELOAM protocol OAMPDU. In some embodiments, SFP parameters may also be continuously shared between the plurality of peer devices.

Method 900 may next proceed to step 920. At step 920, the shared DDM/DOM information and local DDM/DOM information may be continuously monitored at each of the peer devices to identify potential link failures. The shared DDM/DOM information and local DDM/DOM information may be stored in a heuristic database located at each peer device. Thus, the monitoring step may occur within the confines of the heuristic database. For example, heuristic calculations may be performed on stored shared DDM/DOM information to identify false alarms Method 900 may then proceed to step 930. At step 930, a potential link failure may be identified when one or more values in the shared DDM/DOM information and local DDM/DOM information exceeds a respective threshold. When a link is identified as a potential link failure, the active link may be disabled and the connection may be moved to a standby link as discussed in further detail in regards to FIG. 10. In some embodiments of the present disclosure, a system administrator may be notified when the potential link failure is identified.

Figure 10:
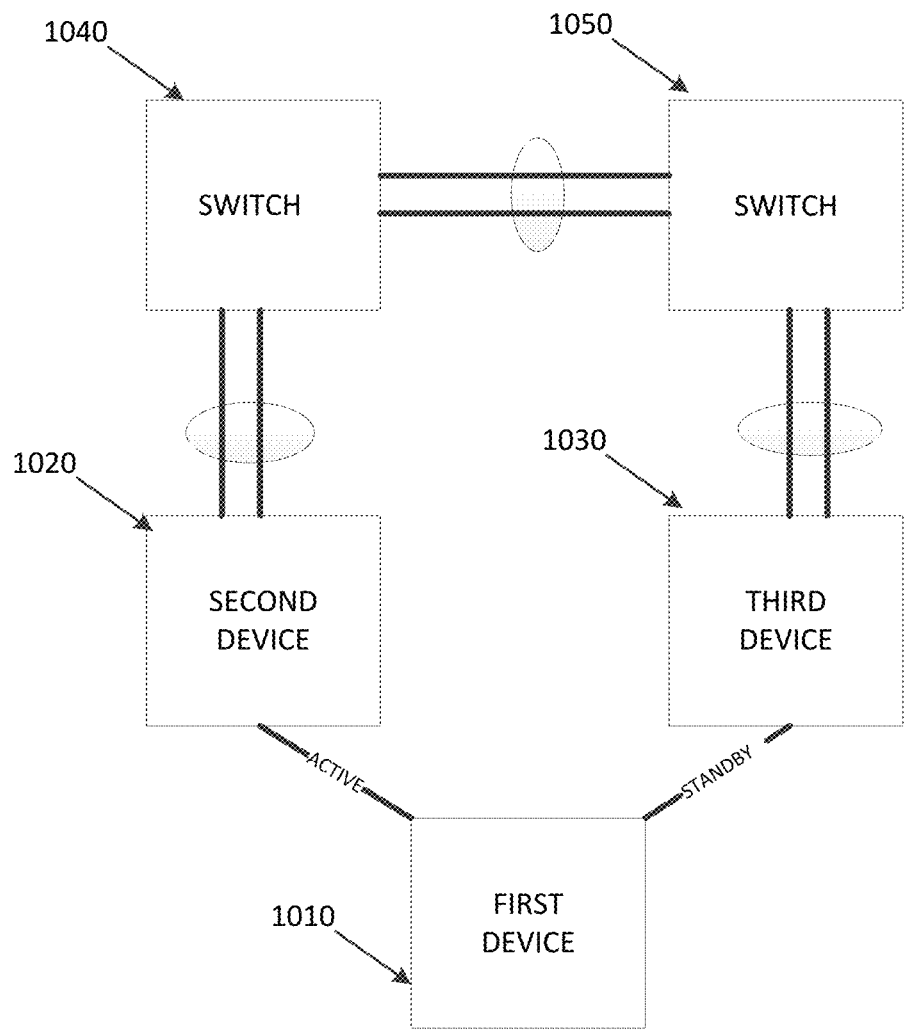
FIG. 10 illustrates embodiments of self-healing capabilities provided by embodiments of the present disclosure.

FIG. 10 illustrates embodiments of self-healing capabilities provided by embodiments of the present disclosure. A first device 1010 may determine that the active link to second device 1020 is identified as a potential link failure. The first device 1010 may alter its transmission path to use a predetermined standby link to third device 1030 before failure of the active path to second device 1020. This allows a remedial action to occur prior to any data loss or degradation and allows first device 1010 continued, unbroken communication to switches 1040 and 1050 that connect to other devices through the affected network.

In some embodiments, a DOM/ELOAM based server device may provide specific policy configurations to be applied in instances where remedial action is desired. In some embodiments, the policies may be based on SFP family or type values. In some embodiments, the policies may be based on local and peer physical parameters and configured thresholds. The policies may be employed to automatically provide hot standby interfaces when ELOAM informs an interface manager that link issues exist.

Although the description has been described with respect to particular embodiments thereof, these particular embodiments are merely illustrative, and not restrictive. For example, although a specific application has been described, it is possible to adapt features of the disclosed embodiments for other applications. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in some embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

The foregoing description of illustrated particular embodiments, including what is described in the Abstract, is not intended to be exhaustive or to limit embodiments to the precise forms disclosed herein. While specific particular embodiments of various equivalent modifications are possible within the spirit and scope, as those skilled in the relevant art will recognize and appreciate. As indicated, these modifications may be made to the present systems and methods in light of the foregoing description of illustrated particular embodiments and are to be included within the spirit and scope.

Thus, while the various systems and methods has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the various embodiments are not be limited to the particular terms used in following claims and/or to the particular embodiment disclosed as the best mode contemplated for carrying out the systems and methods, but that the certain embodiments will include any and all particular embodiments and equivalents falling within the scope of the appended claims.

We claim:

1. A method comprising:
    receiving a remote digital diagnostic monitoring (DMM)/digital optical monitoring (DOM) information at a first peer device from a second peer device, wherein the remote DDM/DOM information is received using an organizational specific type length value (TLV) transmitted using Ethernet link operations, administration, and management (ELOAM) protocol, wherein receiving the remote DDM/DOM information further comprises;
        receiving a plurality of measurement values for a plurality of variables associated with a remote transceiver of the second peer device,
        receiving an alarm threshold for each of the plurality of variables, and
        receiving a transmit fault counter indicating a number of transmit faults that have occurred involving the remote transceiver;
    continuously monitoring the remote DDM/DOM information and local DDM/DOM information at the first peer device to identify potential link failures; and
    identifying a potential link failure when one or more values in the remote DDM/DOM information and local DDM/DOM information exceeds a respective threshold.

2. The method of claim 1, further comprising: switching a link identified as a potential link failure to a standby link.

3. The method of claim 1, further comprising: storing remote DDM/DOM information in a heuristic database.

4. The method of claim 3, further comprising:
    performing heuristic calculations on stored remote DDM/DOM information to identify false alarms.

5. The method of claim 1, wherein receiving the plurality of measurement values for the plurality of variables comprises receiving the plurality of measurement values for small form-factor pluggable (SFP) parameters.

6. The method of claim 1, further comprising: notifying a system administrator when the potential link failure is identified.

7. The method of claim 1, further comprising creating a combined DDM/DOM information containing both the local DDM/DOM information and the remote DDM/DOM information.

8. A system comprising:
    a memory; and
    one or more processors configured to execute instructions stored in the memory, the instructions comprising:
        continuously sharing digital diagnostic monitoring (DMM)/digital optical monitoring (DOM) information between a plurality of peer devices, wherein the DDM/DOM information is shared using an organizational specific type length value (TLV) transmitted using Ethernet link operations, administration and management (ELOAM) protocol, wherein sharing the DMM/DOM information further comprises sharing, with a remote first peer device, a plurality of measurement values for a plurality of variables associated with a transceiver of a second peer device, sharing an alarm threshold for each of the plurality of variables, and sharing a transmit fault counter indicating a number of transmit faults that have occurred involving the transceiver;
        continuously monitoring the shared DDM/DOM information and local DDM/DOM information at each of the peer devices to identify potential link failures; and
        identifying a potential link failure when one or more values in the shared DDM/DOM information and local DDM/DOM information exceeds a respective threshold.

9. The system of claim 8, wherein the organizational specific TLV comprises at least information identifying an operational administration and maintenance (OAM) configuration.

10. The system of claim 8, wherein the one or more processors are further configured to execute instructions comprising: switching a link identified as a potential link failure to a standby link.

11. The system of claim 8, wherein the one or more processors are further configured to execute instructions comprising: notifying a system administrator when the potential link failure is identified.

12. The system of claim 8, wherein the one or more processors are further configured to execute instructions comprising: storing shared DDM/DOM information in a heuristic database.

13. The system of claim 12, wherein the one or more processors are further configured to execute instructions comprising: performing heuristic calculations on stored shared DDM/DOM information to identify false alarms.

14. The system of claim 8, wherein the information TLV fields further comprise a revision field, a state field, an OAMPDU configuration field, and an organization unique identifier field.

15. A non-transitory computer-readable medium that stores a set of instructions which when executed perform a method executed by the set of instructions comprising:
receiving a remote digital diagnostic monitoring (DMM)/digital optical monitoring (DOM) information at a first peer device from a second peer device, wherein the remote DDM/DOM information is received using an organizational specific type length value (TLV) transmitted using Ethernet link operations, administration and management (ELOAM) protocol, wherein receiving the remote DMM/DOM information further comprises;
  receiving a plurality of measurement values for a plurality of variables associated with a remote transceiver of the second peer device,
  receiving an alarm threshold for each of the plurality of variables, and
  receiving a transmit fault counter indicating a number of transmit faults that have occurred involving the remote transceiver;
continuously monitoring the remote DDM/DOM information and local DDM/DOM information at the first peer device to identify potential link failures; and
identifying a potential link failure when one or more values in the remote DDM/DOM information and local DDM/DOM information exceeds a respective threshold.

16. The non-transitory computer readable medium of claim 15, wherein the organizational specific TLV comprises at least information identifying an operational administration and maintenance (OAM) configuration.

17. The non-transitory computer readable medium of claim 15, wherein the one or more processors are further configured to execute instructions comprising: switching a link identified as a potential link failure to a standby link.

18. The non-transitory computer readable medium of claim 15, wherein the method executed by the set of instructions further comprising:
storing the remote DDM/DOM information and local DDM/DOM information in a heuristic database.

19. The non-transitory computer readable medium of claim 18, wherein the method executed by the set of instructions further comprising:
performing heuristic calculations on the stored remote DDM/DOM information and local DDM/DOM information to identify false alarms.

20. The non-transitory computer readable medium of claim 15, wherein the information TLV fields further comprise a revision field, a state field, an OAMPDU configuration field, and an organization unique identifier field.

* * * * *